June 23, 1964 YAO T. LI 3,138,027
PRESSURE GAGE
Filed July 27, 1959 2 Sheets-Sheet 1
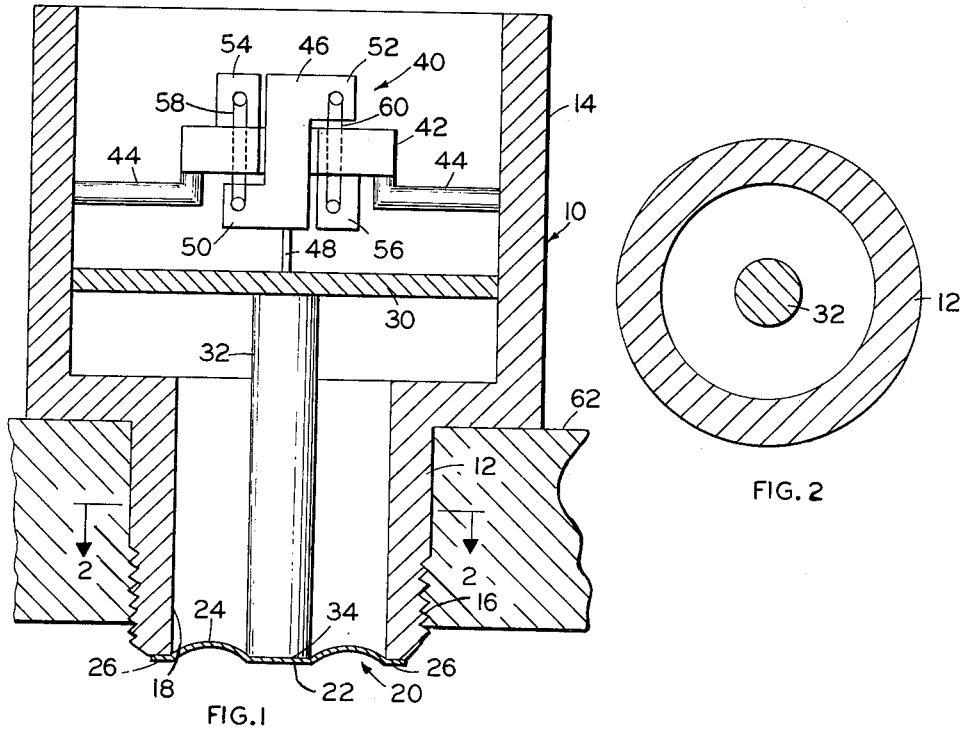
FIG. 1
FIG. 2
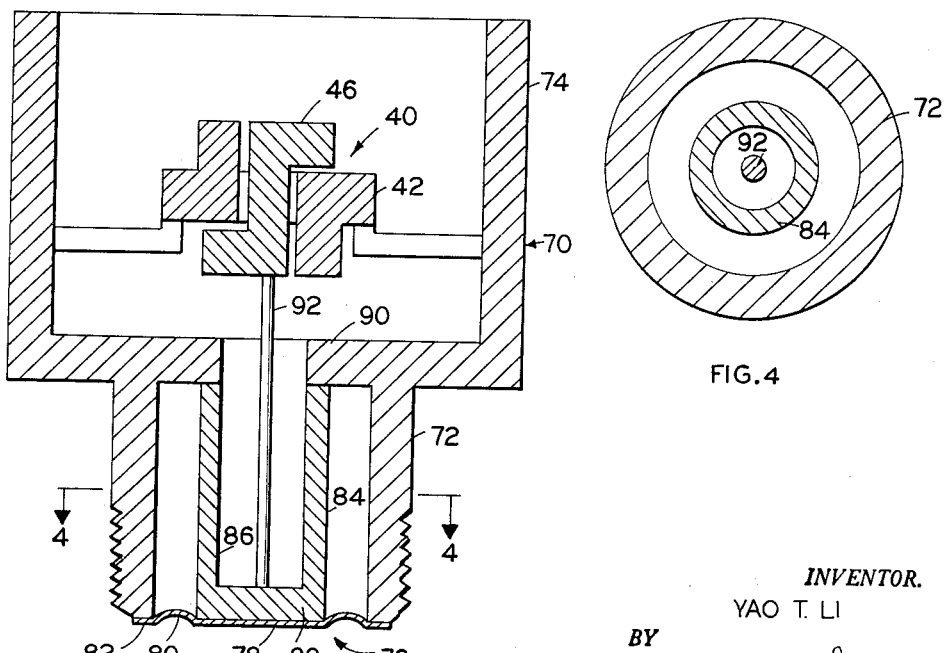
FIG. 3
FIG. 4
INVENTOR.
YAO T. LI
BY
Ezekiel Wolf, Wolf & Greenfield
ATTORNEYS June 23, 1964  YAO T. LI  3,138,027
PRESSURE GAGE Filed July 27, 1959  2 Sheets-Sheet 2

INVENTOR.
YAO T. LI
BY
Ezekiel Wolf, Wolf & Greenfield
ATTORNEYS

United States Patent Office 3,138,027
Patented June 23, 1964

3,138,027
PRESSURE GAGE
Yao T. Li, Huckleberry Hill, South Lincoln, Mass.
Filed July 27, 1959, Ser. No. 829,857
7 Claims. (Cl. 73—398)

This invention relates to pressure gages and more particularly comprises a new and improved pressure gage of miniature size and capable of measuring pressures of a high order.

Diaphragms are commonly used today as pressure sensing elements or pick-ups in gages particularly designed to measure high pressures, that is, pressures in the order of 10,000 lbs. per sq. inch (p.s.i.). For the same maximum stress, the diameter of the diaphragms used as the pressure pick-ups must increase with increases in the intended pressure range to obtain a given diaphragm deflection. The increased diaphragm diameter effects a greater volumetric displacement of the liquid medium whose pressure is being measured. The greater volumetric displacement of the liquid in turn causes a greater disturbance of the hydraulic system and an intolerable amount of energy may be withdrawn from the liquid as a result of its displacement. The volumetric displacement of the liquid medium becomes more critical when the volume of the medium is relatively small.

A common application of gages of the type which I have invented is the measurement of pressure of hydraulic oil in a servo valve. In such a setting, the hydraulic oil may have a volume of but a few cubic centimeters. As the energy withdrawn from a liquid is proportional to its change in volume, a change in the volume of the oil of even .01 cubic centimeter may be more than the hydraulic system can withstand. Thus, it will be appreciated that gages having relatively large diameter diaphragms as sensing elements are often unacceptable.

The primary object of my invention is to avoid the necessity of increasing the diameters of sensing diaphragms when measuring pressures of a high order. By permitting the use of small diaphragms even when the pressures being measured are extremely high, I avoid the loss of excessive amounts of energy in the liquid medium whose pressure is being measured.

To accomplish that and other objects of my invention, I employ a very small thin and flexible diaphragm across the bottom of the pressure gage frame as the sensing or pick-up element. In the preferred embodiment of my invention, the thin and flexible diaphragm is backed up by a heavy stiff diaphragm which furnishes substantially the entire elastic restraint against the pressures exerted on the thin diaphragm. The two diaphragms are interconnected by a stiff nonflexible rod. The thin flexible diaphragm has a round flat central portion welded to one end of the rod and a second surrounding annular portion whose periphery is welded to the frame. Because the heavy diaphragm is disposed within the frame at a location remote from the thin flexible diaphragm and the medium whose pressure is being measured, it is not subjected to the high temperatures at the sensing end of the gage and may well be protected by either natural or artificial means to maintain its spring modulus constant.

In a second embodiment of my invention the heavy rigid diaphragm and the rod are replaced by a strain tube. The strain tube is closed at the end which engages the flat central portion of the thin diaphragm and its other end is connected securely to the frame and thus acts as the elastic restraining member to absorb the pressure load applied against the thin diaphragm.

In a third embodiment of my invention the thin flexible diaphragm is elastically restrained by two strain tubes telescopically arranged one within the other. The lower end of the outer tube is secured to the housing in the region of the thin diaphragm while the lower end of the inner tube is secured to a block which in turn is seated in the flat central portion of the thin diaphragm. The upper ends of the two tubes are rigidly connected together. Although the tubes are exposed to relatively high temperatures as compared to the heavy diaphragm of the preferred embodiment, as will be explained in detail below, the manner in which the tubes are assembled renders them substantially insensitive to the higher temperatures.

In each embodiment of my invention, a signal generator is disposed in the frame either on or beyond the elastic restraining member. In the preferred embodiment of my invention the signal generator is mechanically coupled to the heavy diaphragm and produces a signal proportional to its displacement. In the second embodiment of my invention the signal generator is connected by means of a push wire to the closed end of the strain tube and responds to its movement. In the third embodiment of my invention the strain tubes form part of a bonded strain gage which comprises the signal generator.

These and other objects and features of my invention along with its incident advantages will be better understood and appreciated from the following detailed description of several embodiments thereof, selected for purposes of illustration, and shown in the accompanying drawing in which:

FIGURE 1 is a cross sectional elevation view of the preferred embodiment of my invention;

FIGURE 2 is a cross sectional view taken along the corresponding section line of FIGURE 1;

FIGURE 3 is a cross sectional elevation view of another embodiment of my invention;

FIGURE 4 is a cross sectional view taken along the corresponding section line in FIGURE 3;

Figure 5:
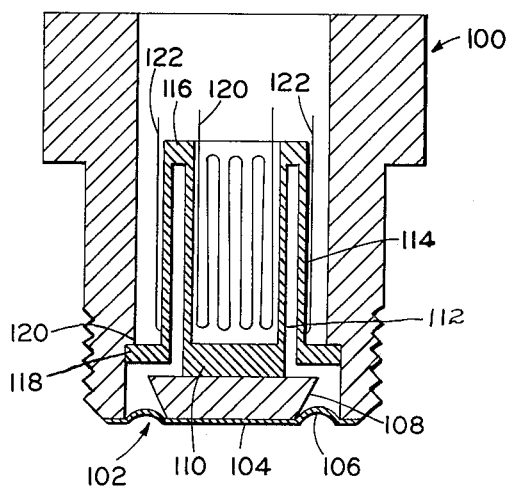
FIGURE 5 is a cross sectional elevation view of still another embodiment of my invention.

The preferred embodiment of my invention shown in FIGURE 1 is organized within a frame 10 having a lower cylindrical section 12 and an upper enlarged cylindrical chamber 14. The lower cylindrical section 12 may be of any length and will vary with different applications. The thickness of the chamber wall containing the medium whose pressure is to be measured will at least in part dictate the length of the section 12. The lower section may be provided with external threads 16 to facilitate anchoring the frame in the wall of the chamber containing the medium.

The lower open end 18 of the section 12 is closed by means of a thin flexible diaphragm 20 having a flat central circular section 22 and an annular concave or dished section 24. The diaphragm normally is preformed by conventional spinning or pressing methods. The diaphragm 20 is preferably made of a non-corrosive metal such as stainless steel and should be welded at its periphery 26 to the lower end of the cylindrical section 12 of the frame.

Extending across the upper chamber 14 of the frame 10 is a stiff and heavy second diaphragm 30 which serves as the elastic restraining member in the gage. The diaphragm 30 preferably is also welded to the frame 10 so that it is permanently fixed thereto. A force transmitting rod 32 circular in section, is secured to the bottom of the heavy diaphragm 30 and extends downwardly through the cylindrical section 12 of the frame and terminates at the flat central circular portion 22 of the thin diaphragm 20. The rod 32 is welded at its lower end 34 in the seat of the soft diaphragm defined by the circular central portion 22. The use of welded joints as opposed to the more conventional silver solder joints is highly desirable because of the non-corrosive properties of welded joints.

A signal generator 40 disposed in the cylindrical chamber 14 above the heavy diaphragm 30 is illustrated only diagrammatically for the generator per se does not form part of this invention. Briefly, the generator 40 includes a yoke 42 supported on a pair of rods 44 secured to the frame 10. Thus, the yoke 42 is fixed with respect to the frame and does not move regardless of the pressure applied to the diaphragm 20.

Figure 6:
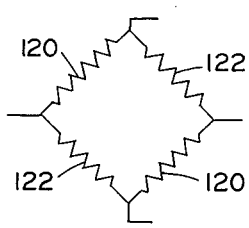
FIGURE 6 is a schematic diagram of the signal generator.

A core 46 is mounted within the yoke 42 and is free to move relative to it. The core 46 is connected by a push wire 48 to the heavy diaphragm 30. The core has a pair of oppositely extending arms 50 and 52 which cooperate with a pair of ears 54 and 56 connected to the yoke 42 to support strain wires 58 and 60 wound in tension about pins carried on the arms and ears. Although but two such windings are shown, it is to be understood that several more are included in the signal generator and these windings form the arms of a conventional bridge circuit of the type suggested in FIGURE 6. It will be appreciated that when the core 46 moves upwardly in the frame 10 in response to upward movement of the heavy diaphragm 30, the winding 58 secured between the arm 50 and ear 54 will have a portion of its tension relieved and its resistance will decrease, while the winding 60 wound between the arm 52 and the ear 56 will elongate and its resistance will increase. A conventional bridge circuit made of such windings will render a signal directly proportional to the displacement of the core 46 with respect to the yoke 42.

For uniformly accurate pressure measurements it will be appreciated that the spring modulus of the diaphragm 30 which serves as the elastic restraining element must remain constant. Therefore, it must be maintained at as nearly a uniform temperature as possible. Its location in the frame 10 inherently provides it with the protection necessary to screen it from the extreme temperature of the medium whose pressure is being measured. Not only is the diaphragm 30 remote from the medium itself but moveover, it is displaced physically from the wall 62 of the chamber containing the medium. The wall 62 will be recognized as being a source of appreciable heat. Thus, the diaphragm 30 is effectively screened from the major sources of heat which could effect its spring modulus, and furthermore, it is so located within the chamber 14 of the frame 10 that it may readily be cooled by natural or artificial means. It may readily be air cooled by the surrounding atmosphere or if desired a cooling medium such as water may be directed to the diaphragm 30 to maintain its temperature substantially constant.

In the embodiment of my invention shown in FIGURES 3 and 4, the frame 70 is substantially identical to the frame 10 of the preferred embodiment of my invention and includes a lower cylindrical section 72 and an upper cylindrical chamber 74. The upper chamber 74 houses the signal generator 40 while the lower section 72 houses the sensing device and the elastic restraining means.

The bottom of the lower section 72 is closed by a diaphragm 76 substantially identical to the diaphragm 20 of FIGURE 1. That is, the diaphragm 76 is soft, thin and flexible and in the absence of some restraining means will readily yield to pressures exerted on it. It includes a flat circular central portion 78 and a surrounding concaved or dished section 80 adjacent its periphery 82 which in turn is welded to the lower end of the cylindrical section 72.

The rod 32 employed in the preferred embodiment of my invention is replaced by a strain tube 84 closed at its lower end 86 by a heavy partition 88. The partition 88 is seated on the flat circular central portion 78 of the diaphragm 76 and preferably is welded in position. Again, the use of welds as opposed to silver solder joints or other well-known means is extremely desirable because of the non-corrosive properties of welded joints.

The upper end of the strain tube 84 is anchored to an inwardly extending flange 90 forming part of the frame 70 at the upper end of the lower cylindrical section 72. The rigidity of the frame 70 which includes the flange 90 is such that the strain tube 84 serves as the elastic restraining member against pressures exerted on the diaphragm 76. A push wire 92 connected at its lower end to the partition 88 of the strain tube is connected at its lower end to the core 46 of the signal generator 40. Thus, in response to movement of the partition 88, the core 46 moves relative to the yoke 42, and by means of the windings carried between the yoke and the core the signal generator produces a signal proportional to the displacement of the partition 88.

Just as in the preferred form of my invention, the elastic restraining means which bears substantially the entire load applied against the diaphragm 76 may be cooled by natural or artificial means to maintain its spring modulus substantially constant. Although the tube 84 may not be cooled as readily as the heavy diaphragm 30, nevertheless, it freely communicates witht he upper chamber 74 housing the signal generator 40 and thus does not constitute a major problem.

In FIGURE 5 I have illustrated still another embodiment of my invention which includes a frame 100 generally cylindrical in shape and closed at its lower end by a thin and flexible diaphragm 102 having a flat circular central portion 104 and a surrounding annular dished portion 106. The periphery of the diaphragm 102 surrounding the portion 106 is welded to the lower terminal portion of the frame 100 as in the other embodiments of my invention.

Welded in the flat circular seat formed in the central portion 104 of the diaphragm 102 is a motion transmitting block 108 also secured to the lower end 110 of the inner of two strain tubes 112 and 114. The strain tubes 112 and 114 form part of the signal generator of the pressure gage.

The coaxially oriented strain tubes 112 and 114 may be integrally formed from a single piece of stock and are connected together at their upper ends as suggested at 116. A flange 118 extends outwardly from the lower terminal portion of the outer tube 114 and is secured to a shoulder 120 formed on the inner surface of the frame 100. Thus, as an upwardly directed force is applied to the lower portion 110 of the inner tube 112, the inner tube 112 acts in compression while the outer tube 114 acts in tension to elastically restrain the force. As a result, when pressure is applied against the lower face of the diaphragm 102, the inner tube 112 is compressed and the outer tube 114 is elongated.

A number of windings 120 and 122 are bonded longitudinally along each of the strain tubes and are stretched and relaxed in response to deformation of the tubes. The windings 120 extending longitudinally of the inner tube 112 form a pair of opposite arms in the conventional bridge circuit shown in FIGURE 6, while the windings 122 secured to the outer tube 114 comprise the other pair of opposed arms in the bridge. Because all of the windings are bonded to the tubes under tension, their change in resistance varies directly with the extent of the deformation of each tube. As a force is directed against the diaphragm 102, the tension of the windings 120 on the inner tube 112 will be somewhat relaxed and their resistance will decrease while the windings 122 carried on the outer tube 114 will be further stressed and their resistance will increase. Therefore, when these windings are connected to form a bridge circuit as suggested in FIGURE 6, the bridge will produce an output signal directly proportional to the pressure applied against the diaphragm 102.

Although the strain tubes 112 and 114 are not mechanically screened from the relatively high temperatures which may be encountered as effectively as the diaphragm 30 in the embodiment of FIGURE 1, nevertheless, the net effect of these temperatures upon the pressure gage is effectively zero. The temperature compensation results from the fact that the two tubes are subjected to the same temperature and each will elongate the same amount in response to a particular temperature rise. Thus, while the connection 116 between the two tubes may move upwardly in the frame 100 in response to an increase in temperature, the lower terminal portion 110 of the inner tube 112 will remain stationary and exert a constant restraining force against the inside of the diaphragm 102.

The use of two strain tubes has still another advantage. A greater output is derived when each of the strain windings is disposed longitudinally with respect to the tubes. If but one tube were used as the elastic restraining member, and one pair of windings were wound longitudinally while the other pair were wound circumferentially about the tube, from Poisson's ratio, the circumferential windings are subjected to only one-third the strain of the longitudinal windings. However, by employing two tubes, pure tension and compression may be utilized as shown in the drawing and a higher output results.

It will be noted in FIGURE 5 that the diameter of the force transmitting block 108 is greater than the diameter of the outer strain tube 114. As a result, the lower terminal portion of the outer tube 114 and its flange 118 serve as a stop to prevent excessive forces applied to the diaphram 102 from damaging the signal generator. The distance between the upper surface of the block 108 and the flange 118 defines the maximum displacement of the diaphragm 102 and the distortion of the tubes 112 and 114.

In each of the embodiments of my invention sharp ridges are avoided in the diaphragms because they are supported by flat solid walls as opposed to sharp edges. The sharp edges found on such devices as strain tubes used in the prior art devices to support several catenary sections formed in the diaphragms severely weaken the diaphragms when pressures of a high order are exerted against them for long durations. Moreover, because the rod 32 in the embodiment shown in FIGURE 1 and the strain tubes 84 and 112 in the embodiments shown in FIGURES 3 and 5 are secured to the thin diaphragms, twisting of the diaphragms is avoided. The fact that the elastic restraining members in each of the embodiments may be readily cooled is still another advantage of my invention. In the embodiment of FIGURE 1, the elastic restraining member in the form of the heavy diaphragm 30 is physically screened from the intense sources of heat.

From the foregoing description, those skilled in the art will appreciate that numerous modifications may be made of my invention without departing from its spirit. Therefore, I do not intend to limit the breadth of my invention to the embodiments illustrated and described. Rather, it is my intention that the breadth of my invention be determined by the appended claims and their equivalents.

What I claim as new and desire to secure by Letters Patent of the United States is:

1. A pressure gage comprising a cylindrical frame, a thin and flexible diaphragm extending across and closing one end of the frame, said diaphragm having a flat central portion and a dished annular portion surrounding the central portion, a force transmitting rod having an end face identical in shape and size to the flat central portion and seated against the central portion, means confined to the inner surface of the central portion of the thin diaphragm securing the end face of the rod to said central portion, a stiff second diaphragm extending across the frame remote from the thin and flexible diaphragm and connected to the other end of the rod, said second diaphragm affording substantially the entire elastic restraint against pressure exerted on the thin diaphragm, and a signal generator responsive to deflection of the second diaphragm.

2. A pressure gage as described in claim 1 further characterized by said thin diaphragm being welded at its edges to the frame and said end face of the rod being welded to the central flat portion of the thin diaphragm.

3. A pressure gage comprising a rigid frame, a thin and flexible diaphragm extending across one end of the frame and closing the frame at that end, said diaphragm having a flat circular central portion and a dished annular portion surrounding the central portion, a strain tube having a flat closed end secured to and covering the entire inner surface of the flat central portion of the diaphragm and having its other end secured to the frame at a location remote from the diaphragm, said tube furnishing substantially the entire elastic restraint against pressure exerted on the diaphragm, a push rod secured to the flat closed end of the tube and extending through the tube, and a signal generator secured to the other end of the rod and responsive to movement of the rod.

4. A gage as defined in claim 3 further characterized by said strain tube being welded to the central portion of the diaphragm.

5. A pressure gage as defined in claim 3 further characterized by means restricted to the inner side of the diaphragm joining the diaphragm and strain tube.

6. A pressure gage comprising a cylindrical frame, a diaphragm secured at its periphery to and closing one end of the frame, said diaphragm having a flat circular central portion and a surrounding annular dished portion, restraining means including a column having a flat end in face to face contact with the entire inner side of the flat portion of the diaphragm, securing means confined to the inner side of the flat portion of the diaphragm securing the column to said flat portion, said restraining means being secured to the frame and exerting substantially all the elastic restraint against pressure exerted against the diaphragm, and a signal generator operatively connected to said restraining means providing a signal in response to movement of said means.

7. A pressure gage comprising a cylindrical frame, a thin and flexible diaphragm extending across and closing one end of the frame, said diaphragm having a flat central portion and a dished annular portion surrounding the central portion, an inflexible force transmitting member having an end face identical in size and shape to the flat central portion and seated against the central portion, a weld confined to the inner side of the diaphragm and joining the inner face of the central portion of the diaphragm to the force transmitting member, a flat stiff elastic restraining member connected to the force transmitting member and to the frame toward the other end of the frame and affording substantially the entire elastic restraint against pressure exerted on the thin diaphragm, and a signal generator operatively associated with the elastic restraining member and responsive to the deflection of the diaphragm.

References Cited in the file of this patent

UNITED STATES PATENTS

| | | |
|---|---|---|
| 1,999,740 | Schmidt et al. | Apr. 30, 1935 |
| 2,260,837 | Kuehni | Oct. 28, 1941 |
| 2,472,045 | Gibbons | May 31, 1949 |
| 2,509,421 | Carter | May 30, 1950 |
| 2,637,210 | Hathaway | May 5, 1953 |
| 2,699,069 | Bailey | Jan. 11, 1955 |
| 2,751,476 | Statham | June 19, 1956 |
| 2,752,558 | Kane | June 26, 1956 |
| 2,969,678 | Watrous | Jan. 31, 1961 |
| 2,989,868 | Rosenberger | June 27, 1961 |

OTHER REFERENCES

Publication titled: "A New High Performance Engine Indicator of the Strain Gage Type," by C. S. Droper and Y. T. Li. Paper presented at Seventeenth Annual Meeting Institute of the Aeronautical Sciences, Hotel Astor, New York city, January 24-27, 1949.